United States Patent
Miranda-Steiner et al.

(10) Patent No.: US 10,805,412 B2
(45) Date of Patent: Oct. 13, 2020

(54) AUTOMATIC CLEAN-UP AND SHARING OF IMAGE CONTENT

(71) Applicant: Microsoft Technology Licensing, LLC, Redmond, WA (US)

(72) Inventors: Emmanuel Miranda-Steiner, Seattle, WA (US); Christopher Steven Wolf, Seattle, WA (US); Can Mehmet Comertoglu, Seattle, WA (US); Chia-Jiun Tan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 15/595,757

(22) Filed: May 15, 2017

(65) Prior Publication Data
US 2018/0332130 A1   Nov. 15, 2018

(51) Int. Cl.
*H04L 29/08* (2006.01)
*G06Q 10/10* (2012.01)
(Continued)

(52) U.S. Cl.
CPC .......... *H04L 67/26* (2013.01); *G06F 16/583* (2019.01); *G06Q 10/10* (2013.01);
(Continued)

(58) Field of Classification Search
CPC ............... H04L 67/26; H04L 67/1097; G06F 17/30247; G06Q 10/1093
See application file for complete search history.

(56) References Cited

U.S. PATENT DOCUMENTS 8,516,050 B1 *  8/2013  Chapweske ........ H04N 1/00204
                                                       709/204
9,215,272 B2  12/2015  Nelson et al.
(Continued)

FOREIGN PATENT DOCUMENTS

WO       2017053032 A1    3/2017

OTHER PUBLICATIONS

Coppock, Mark, "OneDrive for Android updated with automatic whiteboard image detection and more", https://www.onmsft.com/news/onedrive-for-android-updated-wit-automatic-whiteboard-image-detection-and-more, Retrieved on: Mar. 28, 2017, 6 pages.
(Continued)

*Primary Examiner* — Patrice L Winder
*Assistant Examiner* — Aye M Aung (57) ABSTRACT

Non-limiting examples of the present application are directed to automatic adjustment and sharing of content. In one example, a distributed storage service may access content and automatically execute recognition processing for the content. The distributed storage service may automatically execute a clean-up operation on the content based on a result of execution of the recognition processing. A version of the cleaned-up content may be automatically transmitted to a distributed storage associated with a user account of the distributed storage service. As the distributed storage service is executing automatic operations on behalf of a user, the distributed storage service automatically generates a push notification indicating that the content is cleaned-up and ready to be shared with other user accounts of the distributed storage service. In some examples, the push notification may comprise the cleaned-up content. The push notification may be displayed on a client computing device.

20 Claims, 6 Drawing Sheets

(51) Int. Cl.
*G06F 16/583* (2019.01)
*H04L 29/06* (2006.01)
*G06T 5/00* (2006.01)

(52) U.S. Cl.
CPC ..... *G06Q 10/1093* (2013.01); *H04L 67/1097* (2013.01); *G06T 5/00* (2013.01); *H04L 65/4015* (2013.01)

(56) References Cited

U.S. PATENT DOCUMENTS

| | | | |
|---|---|---|---|
| 9,300,912 B2 | 3/2016 | Taneja et al. | |
| 9,350,774 B2 | 5/2016 | Kaplan | |
| 9,531,823 B1 | 12/2016 | Suchland et al. | |
| 2004/0205458 A1* | 10/2004 | Hwang | G06F 40/16 715/255 |
| 2007/0268501 A1 | 11/2007 | Jiang et al. | |
| 2009/0244278 A1* | 10/2009 | Taneja | H04N 7/147 348/143 |
| 2013/0117365 A1* | 5/2013 | Padmanabhan | H04L 67/10 709/204 |
| 2015/0100998 A1* | 4/2015 | Pino, Jr. | H04N 21/8586 725/112 |
| 2015/0131903 A1 | 5/2015 | Kato et al. | |
| 2015/0271446 A1 | 9/2015 | Browne et al. | |
| 2016/0266741 A1* | 9/2016 | Harada | G06F 16/248 |
| 2016/0269451 A1 | 9/2016 | Houchen et al. | |
| 2017/0216721 A1* | 8/2017 | Nomura | A63F 13/352 |
| 2017/0264586 A1* | 9/2017 | Yamasaki | G06F 16/51 |
| 2018/0025084 A1* | 1/2018 | Conlan | G06F 16/955 707/734 |
| 2018/0188899 A1* | 7/2018 | Nigam | G06Q 10/1095 |
| 2018/0315282 A1* | 11/2018 | Aldover | G08B 13/19695 |

OTHER PUBLICATIONS

"Search Report Issued in PCT Application No. PCT/US2018/027205", dated Jun. 20, 2018, 14 Pages.

* cited by examiner

AUTOMATIC CLEAN-UP AND SHARING OF IMAGE CONTENT

BACKGROUND

It's very common for people to take photos without professional equipment and lengthy set up times. This leads to photos that are lower quality than one intends to, such as blurry, out of focus, tilted, etc. Additionally, sometimes people take photos of specific objects such as whiteboards, where the surrounding objects are distracting, and a "cropped" version would be much more desirable". There are applications that provide functionality for adjustment of photos. For example, a user can utilize application functionality to crop a photo, apply filters and make quality improvements, among other examples. However, users do not always remember to use such functionality because initiation of adjustment functionality typically requires users to take manual action. Further, most image processing applications do not detect content within an image, which leads to the user having to manually choose the type of adjustment operations that might best apply. While this may not present an issue for minor adjustments to photos, users are still typically required to go back and manually make editing adjustments for certain types of images such as whiteboard or blackboard photos. Moreover, adjustment functionality for content is typically restricted to camera applications that do not lend to sharing cleaned-up images with specific meeting attendees where an image may have been taken. Users are required to edit their photos and then manually select to share a cleaned-up photo with other users based on memory recall.

SUMMARY

Non-limiting examples of the present application are directed to automatic adjustment of content and sharing of the content. In one example, image content may be accessed that is stored on storage associated with a client computing device. Image content is an example of a type of content that may be automatically adjusted and shared. For ease of understanding, image content may be referenced as content in examples described herein. However, processing operations described herein may extend to other types of content including but not limited to video content, moving image content, etc. In one example, a distributed storage service (e.g. distributed network storage) may be directly accessible on a client computing device through a network connection and: 1) active operation of an application (on the client computing device) or 2) web-based browser activity, among other examples. In some examples, a client computing device running an application for a distributed storage service may execute some of the described processing operations offline when a network connection is not immediately available and subsequently synchronize content with the distributed storage service when a network connection becomes available. The distributed storage service may access image content and automatically detect content within the image content, for example, by applying image recognition processing operations. Further, the distributed storage service may automatically execute a clean-up operation on the image content based on the detected content within the image. A version of the cleaned-up image content may be automatically transmitted to a distributed storage that corresponds with a user account of the distributed storage service. As the distributed storage service is executing automatic operations on behalf of a user, the distributed storage service automatically generates a push notification, for a user account, for example, indicating that the image is cleaned-up and ready to be shared with other user accounts of the distributed storage service. As an example, the push notification indicates that the cleaned-up image content is stored on the distributed storage associated with the user account. In some examples, the push notification may comprise the cleaned-up image content. Other examples of push notifications are further described herein. The push notification may be displayed on the client computing device.

In further examples, processing operations that are related to generation of an exemplary push notification are implemented to improve processing efficiency of devices as well as user interaction with a distributed storage service, for example, when executing actions on behalf of a user and notifying users that cleaned-up image content is available. For example, a user may take a whiteboard image (or images) during a meeting, where the distributed storage service is configured to not only automatically clean-up the whiteboard image but also identify meeting attendees with whom to share the cleaned-up whiteboard image. While a whiteboard image is referenced in this example, it is to be understood that processing operations described herein are applicable to any type of content including video content as a non-limiting example. In at least one example, content identified within an image may be indexed and made digitally searchable to enable a user to quickly go back and find specific content. For instance, specific content within content (e.g. text, object, person) may be identified and catalogued as well as a detected type of the content (e.g. whiteboard image) where a user may desire to search for the type of content (e.g. whiteboard images). In some examples, a type of image may be detected based on the content determined within an image. Examples of image types may comprise but are not limited to: receipts, business cards, whiteboard images, blackboard images, notes, post-its, notebooks, documents, papers and slide presentations, among other examples. A notification can be generated and (in some cases) automatically pushed to the other meeting attendees on behalf of a user who is in possession of the image content. An exemplary distributed storage service may be configured to correspond the image content with a meeting based on an analysis that evaluates an electronic calendar associated with the user account of the distributed service and timestamp data associated with the image content. One or more meeting attendees may be identified for the meeting based on an evaluation of a calendar entry (e.g. electronic calendar entry) associated with the meeting. A generated push notification may be transmitted to user accounts of the distributed storage service that are associated with the one or more meeting attendees.

In other non-limiting examples, an exemplary distributed storage service may automatically manage whiteboard image content, for example, obtained during a business meeting, online conferencing session, etc. A user account of the distributed storage service may be a business account of a user, which may be differentiated from a personal user account of the user. While such examples may directly reference an image type as a whiteboard image, it is to be understood that processing operations described herein are still applicable to any type of content including those identified in the foregoing. As an example, a computing device of a distributed storage service may retrieve an image from a client computing device that is associated with a user account of the distributed storage service. In one example, retrieval of the image may comprise: accessing a storage associated with the client computing device, scanning image content associated with the accessed storage and identifying the image from the scanned image content. In another example, retrieval of the image may comprise receiving, from the client computing device, an upload of the image. For instance, a user may access the distributed storage service via a network connection and upload content (e.g. image content) to a storage of the distributed storage service. The image content may be identified as a whiteboard image. As an example, the whiteboard image may be identified based on execution of image recognition processing operations on the image. Image recognition processing operations are known to one skilled in the art. The distributed storage service may automatically execute a clean-up operation on the whiteboard image. A version of the cleaned-up storing the cleaned-up whiteboard image on a distributed storage associated with the user account. In one example, A push notification may be automatically generated, where the push notification indicates that the whiteboard image is cleaned-up and ready to share based on an automatic execution of the clean-up operation. The push notification may be automatically generated on behalf of the user account of the distributed storage service, for example, without requiring the user to take manual action to clean-up the whiteboard image or launch an email/message to share content with other users. In at least one example, the push notification may comprise the cleaned-up whiteboard image. In some examples, the push notification may comprise a plurality of whiteboard images that may have been cleaned-up and shared. In an alternative instance, the push notification may comprise the original whiteboard image and a cleaned-up version, where adjustment operations were automatically applied to clean-up the whiteboard image. The push notification may be transmitted to one or more client computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Non-limiting examples of the present application are directed to automatic adjustment of content and sharing of the content. Some examples described herein may reference a distributed network storage service that interfaces with a client computing device. Description and claim coverage may vary to describe operations from the perspective of components of the distributed network storage service, a client computing device or a combination thereof (e.g. system). A distributed storage service is a file-hosting service that may be operated as part of its suite of online services. An example of a distributed storage service is a cloud-based file hosting service. The distributed storage service allows users to store and manage files as well as other personal data and may also be utilized for personal services and/or business services. Files can be synced to a computing device and accessed from a web browser such as a mobile computing device (e.g. through browser-based access or an application executing on the mobile computing device). File data associated with the distributed storage service may also be shared publicly or with specific people such as other user accounts of the distributed storage service. In one example, a user account of the distributed storage service may be a business account that is utilized for business/professional purposes. For instance, image content from a meeting may be identified and automatically adjusted (e.g. cleaned-up) on behalf of the user. Examples described herein further relate to management of notification, to one or more users, of automatic clean-up of image, where the distributed storage service (or a mobile application thereof) may be adapted to generate and transmit notifications to user accounts and/or client computing devices. The distributed storage service may be further adapted to enhance sharing of cleaned-up image content with other users (e.g. meeting attendees of a meeting in which the image content is from).

Accordingly, the present disclosure provides a plurality of technical advantages including but not limited to: automatic clean-up of image content on behalf of a user, ability to automate generation of notifications of automatic clean-up, assistance with sharing cleaned-up image content with other users, extensibility to integrate different applications/services of a distributed network to enhance processing efficiency of the distributed storage service, more efficient operation of processing devices (e.g., saving computing cycles/computing resources) in managing automatic clean-up of image content and notification of automatic clean-up, ability to make content digitally searchable where users can quickly locate content through searching based on specific portions of the content or a detected type of the content, improved user interaction with users of a distributed storage service including transparency for automatic actions being executed by the distributed storage service, an ability to execute actions on behalf of a user so that users do not have to manually do so and ability to automatically share content between users, among other examples.

Figure 1:
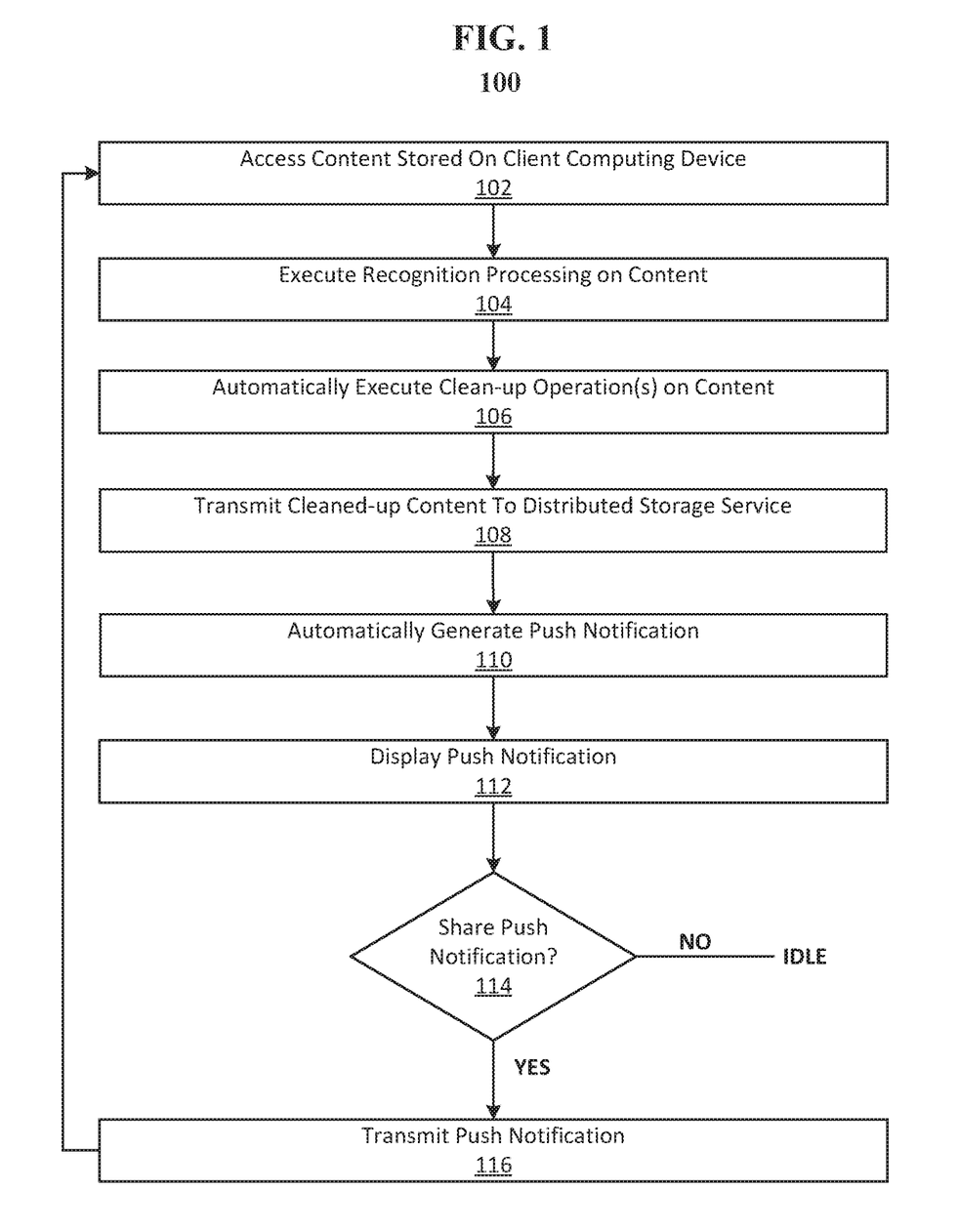
FIG. 1 illustrates an exemplary method related to operations executed by a client computing device for management of automatic clean-up of image content with which aspects of the present disclosure may be practiced.

FIG. 1 illustrates an exemplary method 100 related to operations executed by a client computing device for management of automatic clean-up of image content with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc.

Method 100 begins at processing operation 102, where content that is stored on a client computing device is accessed. Image content is an example of a type of content that may be automatically adjusted and shared. For ease of understanding, image content may be referenced as content in examples described herein. However, processing operations described herein may extend to other types of content including but not limited to video content, moving image content, etc. In one example, a distributed storage service (e.g. distributed network storage), as previously described herein, may be directly accessible on a client computing device through a network connection and: 1) active operation of an application (on the client computing device) or 2) web-based browser activity, among other examples. In some examples, a client computing device running an application for a distributed storage service may execute some of the described processing operations offline when a network connection is not immediately available and subsequently synchronize content with the distributed storage service when a network connection becomes available. In one instance, the distributed storage service may be actively executing on a client computing device or alternatively executing in the background on the client computing device. The distributed storage service is configured to actively detect new content that is stored on a storage of the client computing device. For instance, a user may upload new image content to a storage associated with the distributed storage service. In one example, a user may move image content into storage (e.g. folder, directory, etc.) associated with the distributed storage service. In another example, the distributed storage service may be configured to actively execute scanning operations to detect when new content is added to the client computing device by a user, for example, through a camera application.

Flow may proceed to processing operation 104, where the distributed storage service is configured to automatically execute recognition processing on the content. For example, image recognition processing operations may be executed on image content when the content is image content. Processing operations for recognition processing of content including image recognition processing are known to one skilled in the art. As an example, the recognition processing operations executed may be configured to detect specific portions, objects, etc. within the content as well as a type of the content (e.g. type of image). In examples where the content in image content, accessed image content may comprise one or more images, where images are analyzed one by one to determine to determine an image type of each image. As an example, processing operation 104 may detect an image type through execution of optical character recognition (OCR) processing or other types of known image recognition processing. In one instance, processing operations described in operation 104 may evaluate different aspects of an image (e.g. color, contrast, resolution, border regions) as well as a context of the content within a specific image (e.g. text, entity recognition, etc.). The distributed storage service may be connected to other applications/services of a platform (as previously described), that may be configured to interface with the distributed storage service to: analyze content within a specific image, determine specific types of content (e.g. entity/subject analysis), predict intent for a user and provide results data for contextual analysis of content identified within an image, among other examples. Additional resources that may be utilized to analysis image content includes but is not limited to: web search services and/or intelligent personal assistant services, among other examples. Examples described herein may be configured to work with any type of image. Some types of images that may be detected (processing operation 104) comprise but are not limited to: receipts, business cards, whiteboard images, blackboard images, notes, post-its, notebooks, documents, papers, slides/presentation content and personal photos among other examples.

In at least one example, content identified within an image may be indexed and made digitally searchable to enable a user to quickly go back and find specific content. That is, examples of the present disclosure further provide the ability to make content digitally searchable where users can quickly locate content through searching based on specific portions of the content or a detected type of the content. For instance, specific content within content (e.g. text, object, person) may be identified and catalogued as well as a detected type of the content (e.g. whiteboard image) where a user may desire to search for the type of content (e.g. whiteboard images). As an example, identified portions of content, terms or keywords associated with the content (or portions thereof) may be persisted in memory and made searchable through applications/services to enable easier recall of the content at a later point in time. As an example, such search functionality may be incorporated into a user interface of an exemplary distributed storage service.

Once recognition processing operations are executed on the content, flow may proceed to processing operation 106, where the distributed storage service (operating on the client computing device) automatically executes a clean-up operation on the content, for example, based on results of the recognition processing on the content. Image clean-up operations executed for image content are known to one skilled in the art. Clean-up of content includes any processing operations that may adjust content (e.g. image content) including operations that modify size, orientation, add/remove portions of content (including adding identification such as text or rich media objects). Other examples of clean-up operations on content such as image content may comprise adjusting one or more of: image quality (or portions of an image), luminance, color, contrast, image size, resolution and border regions, among other examples. While operations for clean-up operations are known to one skilled in the art, the distributed storage service is newly configured to automatically initiate clean-up operations based on results of the recognition processing on the content (processing operation 104), for example, a type of image. In one example, operations for image clean-up may be executed when a certain image type is detected (e.g. whiteboard image) rather than executing clean-up operations on every image that is accessed. However, in alternative examples, different types of clean-up operations may apply to different images types where a clean-up operation for a personal photo may differ from that of a whiteboard image.

Once the content (e.g. an image) is automatically cleaned-up, a version of the cleaned-up content may be automatically transmitted (processing operation 108) to a distributed storage associated with a user account of the distributed storage service. In some instances, the adjusted content may be stored on the distributed service at least until a determination is made by the user as to whether to keep (or share) the adjusted/cleaned-up content. In one instance, the user may prefer not to keep or share the adjusted content where the user may choose to discard the adjusted content. In any case, the original version of the content may remain locally on the computing device. In alternative examples, an original version of an adjusted content may also be stored on a distributed storage of the distributed storage service even in cases where the content is accessed (and stored) on the client computing device.

As the distributed storage service is executing automatic operations on behalf of a user, the distributed storage service is further configured to automatically generate (processing operation 110) a push notification for the executed clean-up operations. The push notification, generated in processing operation 110, is utilized to indicate that the content (e.g. image) is cleaned-up and ready to be shared with other user accounts of the distributed storage service. As an example, the push notification indicates that cleaned-up image content is stored on the distributed storage associated with the user account. In some examples, the push notification may comprise cleaned-up image content, where a representation of the cleaned-up image content may be presented when the push notification is displayed (e.g. on a client computing device). In further examples, the push notification may comprise a plurality of content (e.g. more than one image) that may have been cleaned-up and shared. Examples described herein may execute automatic clean-up operations on multiple content objects, for example, where multiple whiteboard images are taken in a meeting. In an alternative instance, the push notification may comprise the original content and a cleaned-up version of the content, where adjustment operations were automatically applied to content where clean-up operations have been applied. In some examples, an exemplary push notification may comprise a user interface (UI) feature that is selectable to enable sharing of the cleaned-up image content with other users (e.g. other attendees of a meeting).

Generation (processing operation 110) of an exemplary push notification may further comprise processing operations for identifying other users with whom to share the cleaned-up content. For example, a user may take a whiteboard image during a meeting, where the distributed storage service is configured to not only automatically clean-up the whiteboard image but also identify meeting attendees with whom to share the cleaned-up whiteboard image. While a whiteboard image is referenced in this example, it is to be understood that processing operations described herein are applicable to any image type as described herein. A notification can be generated and in some cases automatically pushed to the other meeting attendees on behalf of a user who is in possession of the content. An exemplary distributed storage service may be configured to correspond the content with a meeting based on an analysis that evaluates an electronic calendar associated with the user account of the distributed service and timestamp data associated with the content. For instance, a timestamp associated with the content may be matched with a calendar entry of an electronic calendar of the user. One or more meeting attendees may be identified for the meeting based on an evaluation of a calendar entry (e.g. electronic calendar entry) associated with the meeting. The calendar entry for the meeting may be used to identify users that are attendees of the meeting (and in further examples users that may tentatively be scheduled to attend or may have declined the meeting invitation). In one instance, electronic calendars of the other users may be confirmed based on an initial identification of a potential meeting attendee. An exemplary push notification may be configured to automatically identify meeting attendees for the possessor of the content. For instance, a user may utilize the push notification to share cleaned-up image content with one or more of the others users (e.g. attendees of the meeting or users that were not able to attend the meeting) without having to manually generate an email/message, add content to share and locate users to share the content with, etc.

Flow may proceed to processing operation 112, where the generated push notification is displayed on one or more client computing devices. As an example, display (processing operation 112) of a push notification on a client computing device may extend to displaying the push notification in a specific application/service such as an application associated with the distributed storage service, a web browser (e.g. web page being accessed) or through an operating system executing on the client computing device, among other examples. In an example where the push notification is displayed through an exemplary distributed storage service, processing operations of the distributed storage service may not only be configured to automatically generate an exemplary push notification but also trigger automatic display of the push notification on a client computing device of a user. In one example, processing operation 112 comprises transmitting the push notification to user accounts of the distributed storage service that are associated with the one or more meeting attendees. The distributed storage service may be configured to push the generated notification directly to a client computing device of a user (associated with a user account of the distributed storage service). In another example, the push notification is transmitted to the user account of the user, where the push notification is displayed when the user logs into its user account, for example, using a client computing device. In some examples, the distributed storage service is configured to provide the push notification to multiple different users (e.g. attendees of a meeting in which the image content is identified to correspond with).

In examples where a push notification is not automatically transmitted to multiple different users, method 100 may proceed to decision operation 114, where it is determined whether an indication is received to share the push notification with other users. As an example, an exemplary push notification may comprise a UI feature that enables quick sharing of the push notification and/or the cleaned-up image content with other users. Input may be received in association with the push notification (e.g. a selectable of a UI feature in the push notification) that triggers transmission of the cleaned-up content to other user accounts associated with the distributed storage service. Consider the examples described above where a cleaned-up whiteboard image is associated with a meeting (e.g. through analysis of electronic calendars corresponding with user accounts of the distributed storage service). As an example, an exemplary push notification may comprise: the cleaned-up whiteboard image, indication of other users that were identified to be in the meeting (e.g. meeting attendees) and provide a UI feature that, upon selection, triggers transmission of the push notification to the other users. It is to be understood that content and presentation of an exemplary notification may vary according to developer specifications without departing from the spirit of the present disclosure.

In examples where input is not received for sharing of the push notification, flow of method 100 branches NO and processing remains idle. In examples where input is received to share the push notification with other users, flow of method 100 branches YES and processing proceeds to processing operation 116. At processing operation 116, a push notification is transmitted to other users. In examples, a push notification may be transmitted to other user accounts of the distributed storage service, which may be accessed using other client computing devices. In one example, transmission of the already generated push notification to other users may comprise forwarding the push notification to the other users. In another example, transmission of the push notification to the other users may comprise generating a new notification tailored for the other users. For instance, the new notification may comprise the cleaned-up whiteboard image and an indication that the cleaned-up whiteboard image has been shared by a specific user. The new notification may further comprise identification of the meeting that corresponds with the whiteboard image. Notifications may further comprise additional context data related to the meeting, users, for example, in the form of contextual suggestions to assist the users with subsequent communication. Exemplary contextual suggestions comprise addition content or data that may be presented in any format including a rich format providing interactive links for a user to select, which may enhance a user experience. An exemplary distributed storage service may interface with other applications/services of a platform (e.g. Microsoft® Office365®) to enable generation of contextual suggestions. Examples of such applications/services include but are not limited to: web search services, intelligent personal assistant services, input understanding services, knowledge databases and knowledge graphs (e.g. subject/entity identification), among other examples.

Figure 2:
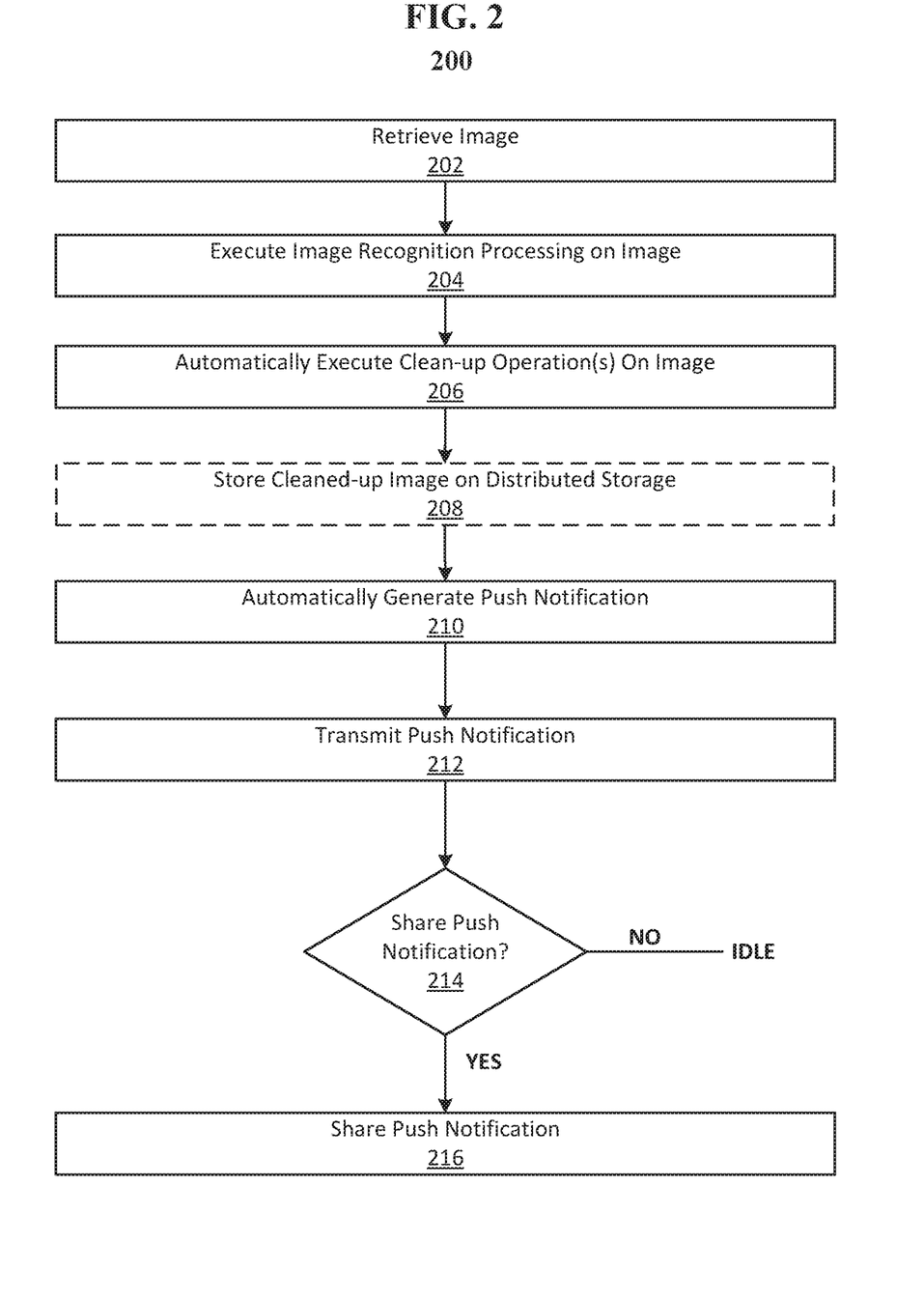
FIG. 2 illustrates an exemplary method related to operations executed by a component of a distributed storage service for management of automatic clean-up of image content with which aspects of the present disclosure may be practiced.

FIG. 2 illustrates an exemplary method 200 related to operations executed by a component of a distributed storage service for management of automatic clean-up of image content with which aspects of the present disclosure may be practiced. An exemplary distributed storage service may automatically manage whiteboard image content, for example, obtained during a business meeting. A user account of the distributed storage service may be a business account of a user, which may be differentiated from a personal user account of the user. While such examples may directly reference an image type as a whiteboard image, it is to be understood that processing operations described herein are still applicable to any image type including those identified in the foregoing. As an example, method 200 may be executed by an exemplary processing device and/or system such as those shown in FIGS. 3-5. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc.

Method 200 begins at processing operation 202, where a component (e.g. computing device or system of computing devices) associated with a computing device of a distributed storage service may retrieve an image from a client computing device that is associated with a user account of the distributed storage service. In one example, retrieval of the image may comprise: accessing a storage associated with the client computing device, scanning image content associated with the accessed storage and identifying the image from the scanned image content. In another example, retrieval of the image may comprise receiving, from the client computing device, an upload of the image. For instance, a user may access the distributed storage service via a network connection and upload content (e.g. image content) to a storage of the distributed storage service.

Once image content is accessed, flow may proceed to processing operation 204, where image recognition processing operations are executed on the image. As identified above, image recognition processing operations that may be applied to evaluate image content are known to one skilled in the art. Further, examples of recognition processing have been provided in the foregoing description. As an example, image recognition processing may comprise identification of an image type for the image content. As an example, the image content may be identified as a whiteboard image, where image recognition processing is executed to identify that an image is a whiteboard image.

Flow may proceed to processing operation 206, where the distributed storage service may automatically execute a clean-up operation on the image (e.g. whiteboard image). Examples related to automatic execution of clean-up operations are described in the foregoing description of method 100 (FIG. 1). In some examples, a version of a cleaned-up whiteboard image may be stored (processing operation 208) on a distributed storage associated with a user account of the distributed storage service.

Once image content is automatically cleaned-up on behalf of a user, flow may proceed to processing operation 210, where a push notification is generated for a user to let the user know that processing operations have been automatically executed on the image content. An exemplary push notification has been described in the foregoing examples including the description of method 100 (FIG. 1). In on example, the push notification may be automatically generated, where the push notification indicates that an image (e.g. whiteboard image) is cleaned-up and ready to share based on an automatic execution of the clean-up operation. The push notification may be automatically generated on behalf of the user account of the distributed storage service, for example, without requiring the user to take manual action to clean-up the image or launch an email/message to share content with other users. In at least one example, the push notification may comprise the cleaned-up image content such as the cleaned-up whiteboard image. As described in method 100, generation of an exemplary push notification may comprise identifying an online meeting that corresponds to a whiteboard image and providing the push notification to one or more users associated with the meeting. An exemplary push notification may be tailored for a specific user account or more generally may be generated to be shared with multiple users (e.g. attendees of a meeting).

Once a push notification is generated (processing operation 210), method 200 may proceed to transmit (processing operation 212) the push notification to one or more client computing devices. The push notification may be in the form of a device notification system, an email or any other method of notification (e.g. input modality) that a computing device is configured to receive. In one example, processing operation 212 comprises transmitting the push notification to user accounts of the distributed storage service that are associated with the one or more meeting attendees. The distributed storage service may be configured to push the generated notification directly to a client computing device of a user (associated with a user account of the distributed storage service). In another example, the push notification is transmitted to the user account of the user, where the push notification is displayed when the user logs into its user account, for example, using a client computing device. The transmitted push notification may be displayed on a display associated with a client computing device to which the push notification is transmitted.

In examples where a push notification is not automatically transmitted to multiple different users, method 200 may proceed to decision operation 214, where it is determined whether an indication is received to share the push notification with other users. As an example, an exemplary push notification may comprise a UI feature that enables quick sharing of the push notification and/or the cleaned-up image content with other users. Input may be received in association with the push notification (e.g. a selectable of a UI feature in the push notification) that triggers transmission of the cleaned-up whiteboard image to other user accounts associated with the distributed storage service. Consider the examples described above where a cleaned-up whiteboard image is associated with a meeting (e.g. through analysis of electronic calendars corresponding with user accounts of the distributed storage service). As an example, an exemplary push notification may comprise: the cleaned-up whiteboard image, indication of other users that were identified to be in the meeting (e.g. meeting attendees) and provide a UI feature that, upon selection, triggers transmission of the push notification to the other users. It is to be understood that content and presentation of an exemplary notification may vary according to developer specifications without departing from the spirit of the present disclosure.

In examples where input is not received for sharing of the push notification, flow of method 200 branches NO and processing remains idle. In examples where input is received to share the push notification with other users, flow of method 200 branches YES and processing proceeds to processing operation 216. At processing operation 216, a push notification is transmitted to other users. Examples related to displayed notifications have been described in the foregoing including the description of method 100 (FIG. 1). In examples, a push notification may be transmitted to other user accounts of the distributed storage service, which may be accessed using other client computing devices. In one example, transmission of the already generated push notification to other users may comprise forwarding the push notification to the other users. In another example, transmission of the push notification to the other users may comprise generating a new notification tailored for the other users.

Figure 3:
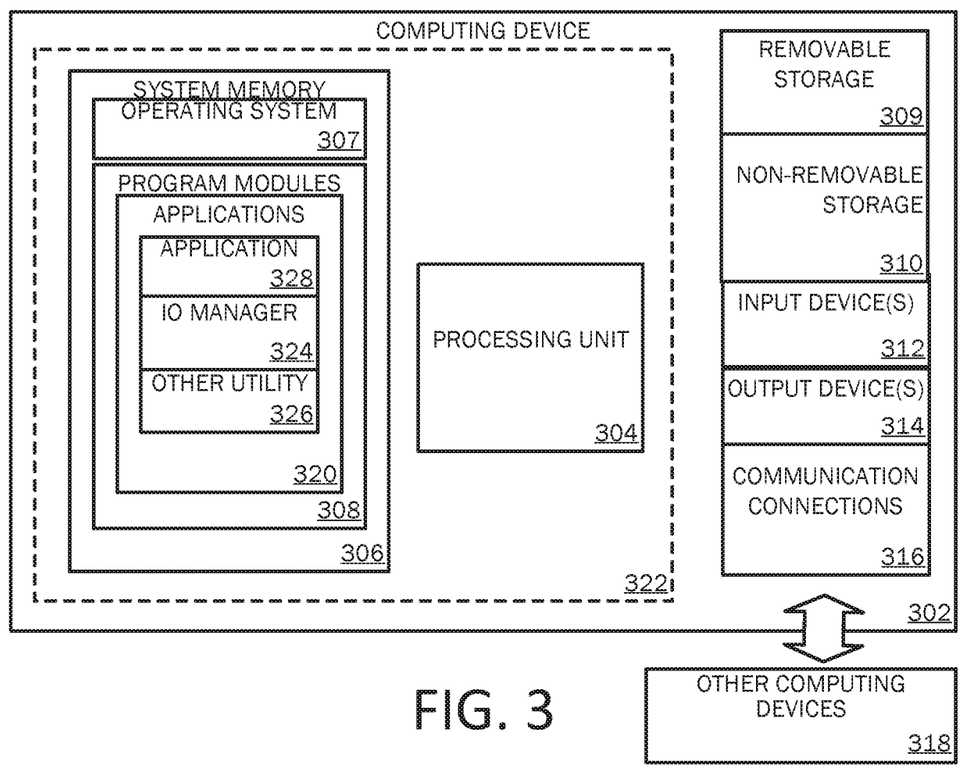
FIG. 3 is a block diagram illustrating an example of a computing device with which aspects of the present disclosure may be practiced.
Figure 4A:
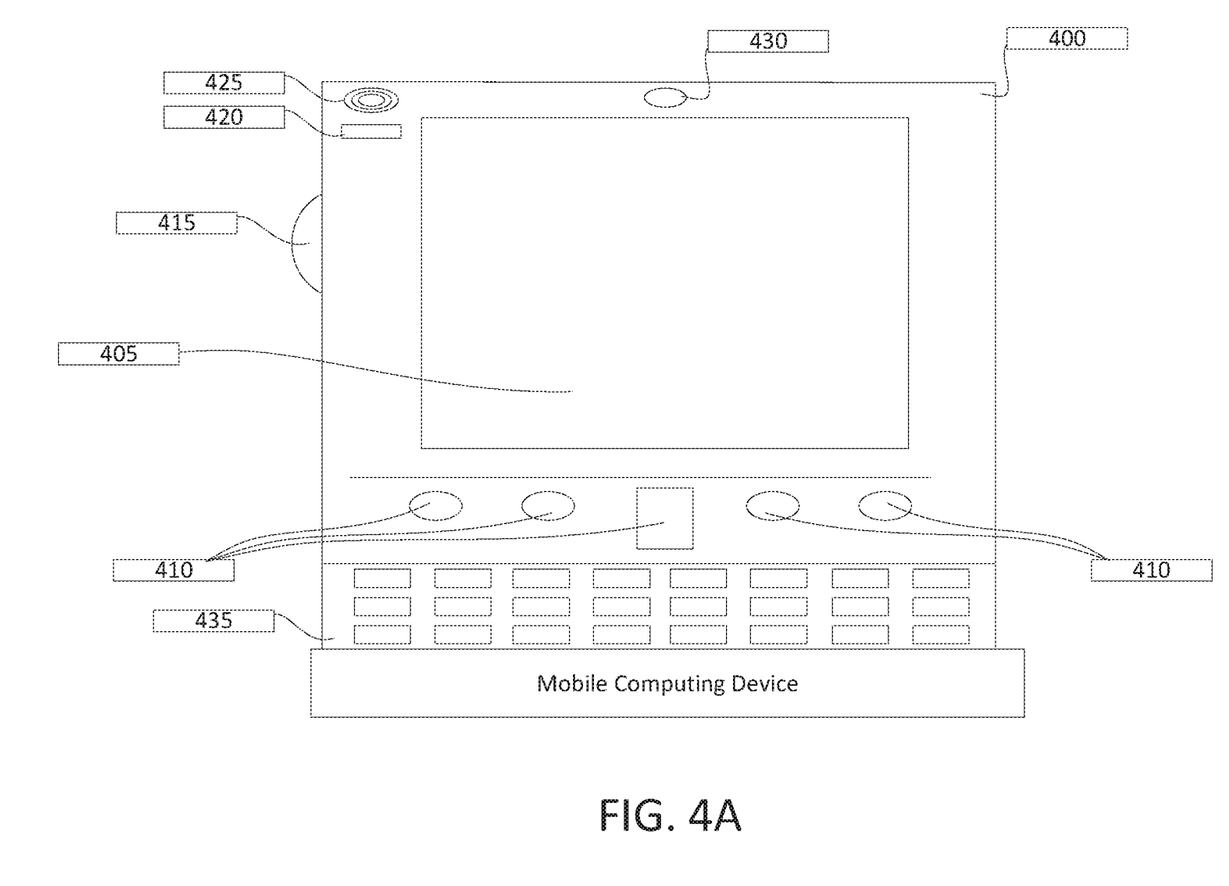
FIGS. 4A and 4B are simplified block diagrams of a mobile computing device with which aspects of the present disclosure may be practiced.
Figure 4B:
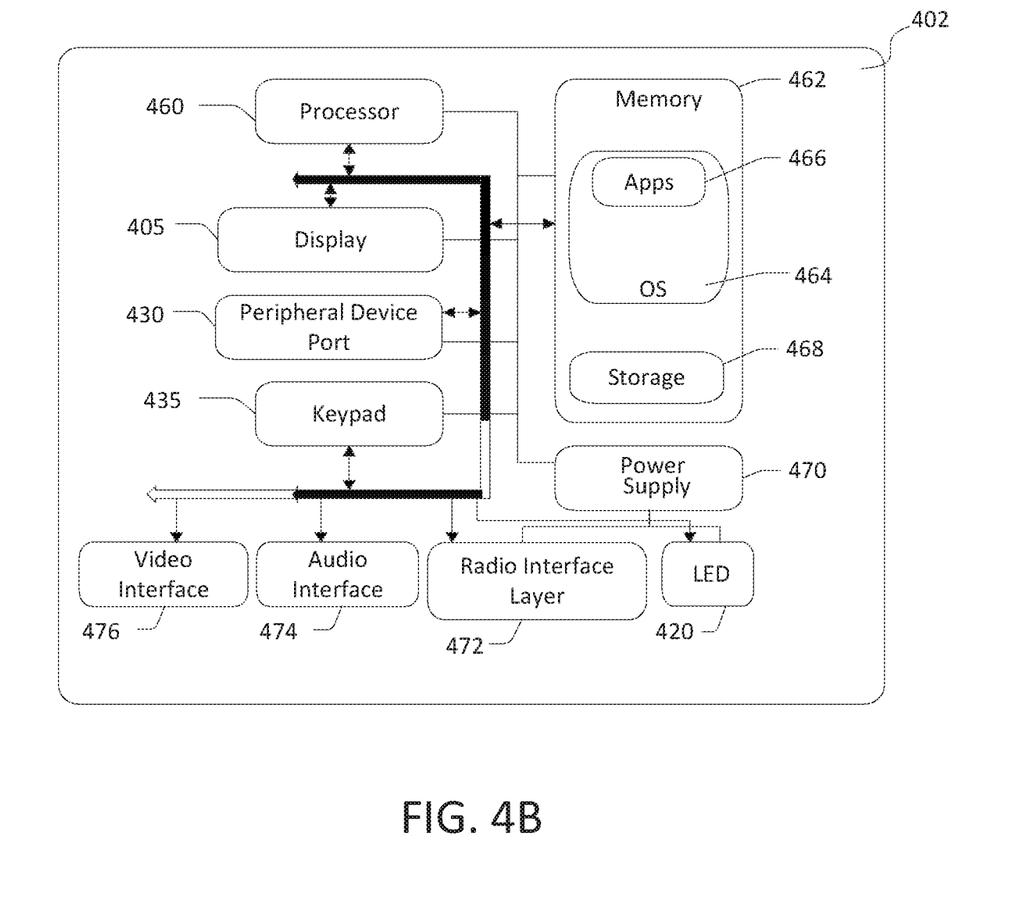
Figure 5:
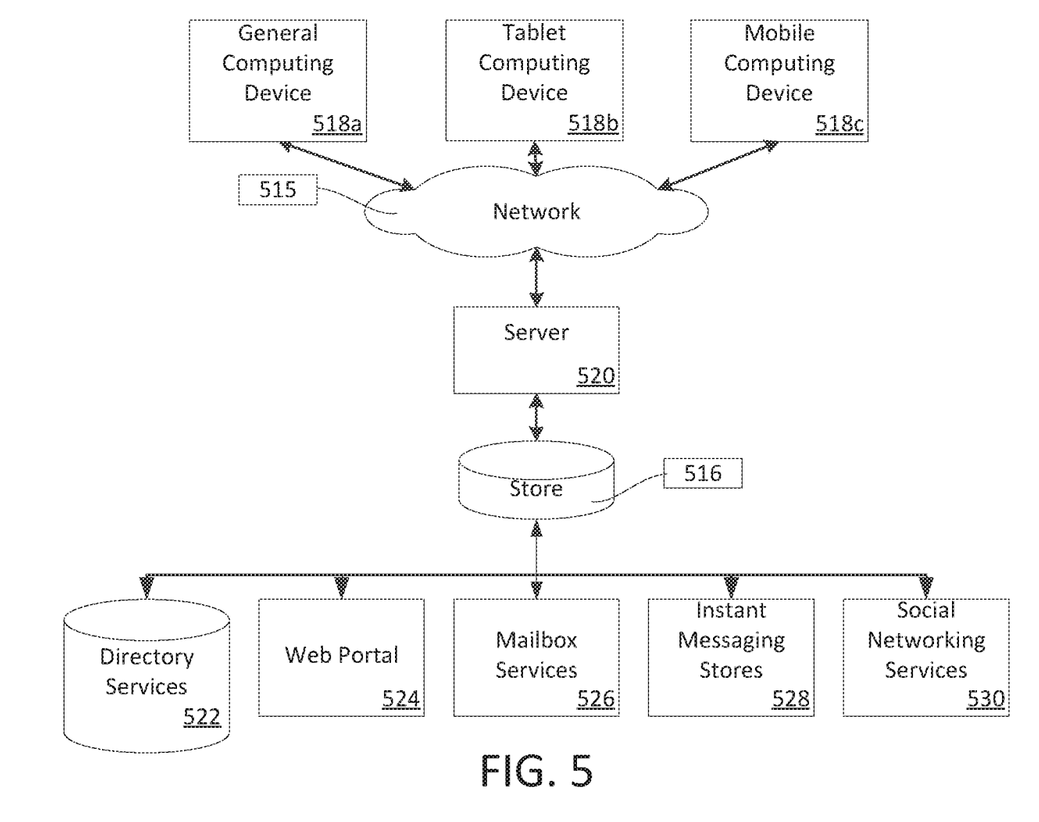
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for management of automatic clean-up of image content and management of notification of the automatic clean-up of the image content as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 409 and a non-removable storage device 310.

As stated above, a number of program modules and data files may be stored in the system memory 306. While executing on the processing unit 404, program modules 408 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 404 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for management of automatic clean-up of image content and management of notification of the automatic clean-up of the image content as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for management of automatic clean-up of image content and management of notification of the automatic clean-up of the image content as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
 accessing content that is stored on storage associated with a client computing device;
 executing recognition processing on the content that comprises identifying a type of the content;
 automatically executing a clean-up operation on the content based on results of execution of the recognition processing to generate cleaned-up content;
 in response to executing the clean-up operation, automatically storing, without user interaction, the cleaned-up content to a distributed storage associated with a user account of a distributed storage service;

in response to automatically storing the cleaned-up content on the distributed storage, automatically generating, by the distributed storage service, a push notification indicating that the content is cleaned-up and was automatically stored for the user account on the distributed storage associated with the user account, wherein the push notification further comprises an indication that the clean-up operation has been applied to the content and the cleaned-up content was stored for the user account on the distributed storage and is ready to be shared with other users; and displaying the push notification on the client computing device.

2. The method of claim 1, wherein the push notification comprises the cleaned-up content.

3. The method of claim 2, wherein the content is image content, and wherein generation of the push notification comprises:

corresponding the image content with a meeting based on an analysis that evaluates an electronic calendar associated with the user account of the distributed storage service and timestamp data associated with capture of the image content, identifying one or more meeting attendees for the meeting based on an evaluation of a calendar entry associated with the meeting, and transmitting the push notification to user accounts of the distributed storage service that are associated with the one or more meeting attendees.

4. A method comprising:

retrieving, by a computing device of a distributed storage service, an image from a client computing device that is associated with a user account of the distributed storage service;

identifying that the image is a whiteboard image;

automatically executing a clean-up operation on the whiteboard image to generate a cleaned-up whiteboard image;

in response to executing the clean-up operation, automatically storing, without user interaction, the cleaned-up whiteboard image to a distributed storage associated with a user account of the distributed storage service;

in response to automatically storing the cleaned-up whiteboard image on the distributed storage, automatically generating, by the distributed storage service on behalf of the user account of the distributed storage service, a push notification indicating that the clean-up operation has been applied to the whiteboard image and the cleaned-up whiteboard image was automatically stored for the user account on the distributed storage associated with the user account; and transmitting the push notification to the client computing device.

5. The method of claim 4, wherein the identifying of the whiteboard image further comprises executing image recognition processing operations on the image.

6. The method of claim 4, wherein the automatically generating of the push notification further comprises:

corresponding the whiteboard image with a meeting based on an analysis that evaluates an electronic calendar associated with the user account of the distributed storage service and timestamp data associated with capture of the whiteboard image, identifying meeting attendees for the meeting based on an evaluation of a calendar entry associated with the meeting, and including an indication of the meeting attendees in the push notification.

7. The method of claim 6, wherein the push notification comprises the cleaned-up whiteboard image.

8. The method of claim 7, wherein the meeting attendees comprise two different meeting attendees, wherein the two different meeting attendees comprise a first attendee that is associated with the user account and a second attendee that is associated with another user account of the distributed storage service, and wherein the transmitting further comprises automatically sending the push notification to the other user account of the distributed storage service.

9. The method of claim 7, further comprising: receiving, from the client computing device, a selection, associated with the push notification, that indicates to share the cleaned-up whiteboard image with another attendee of the meeting attendees identified in the push notification, and sharing the cleaned-up whiteboard image with the other attendee.

10. The method of claim 4, wherein the retrieving of the image further comprises scanning image content associated with the client computing device and identifying the image from the scanned image content.

11. The method of claim 4, wherein the retrieving of the image further comprises receiving, from the client computing device, an upload of the image.

12. A system associated with a distributed storage service, wherein the system comprising:

at least one processor; and a memory, operatively connected with the at least one processor, storing computer-executable instructions that, when executed by the at least one processor, causes the at least one processor to execute a method that comprises:

retrieving an image from a client computing device that is associated with a user account of the distributed storage service;

identifying that the image is a whiteboard image;

automatically executing a clean-up operation on the whiteboard image to generate a cleaned-up whiteboard image;

in response to executing the clean-up operation, automatically storing, without user interaction, the cleaned-up whiteboard image to a distributed storage associated with a user account of the distributed storage service;

in response to automatically storing the cleaned-up whiteboard image on the distributed storage, automatically generating, by the distributed storage service on behalf of the user account of the distributed storage service, a push notification indicating that the clean-up operation has been applied to the whiteboard image and the cleaned-up whiteboard image was automatically stored for the user account on the distributed storage associated with the user account; and transmitting the push notification to the client computing device.

13. The system of claim 12, wherein the identifying of the whiteboard image further comprises executing image recognition processing operations on the image.

14. The system of claim 12, wherein the automatically generating of the push notification further comprises:

corresponding the whiteboard image with a meeting based on an analysis that evaluates an electronic calendar associated with the user account of the distributed storage service and timestamp data associated with capture of the whiteboard image, identifying one or more meeting attendees for the meeting based on an evaluation of a calendar entry associated with the meeting, and including an indication of the one or more meeting attendees in the push notification.

15. The system of claim 14, wherein the push notification comprises the cleaned-up whiteboard image.

16. The system of claim 15, wherein the one or more meeting attendees comprises two different meeting attendees, and wherein the two different meeting attendees comprise a first attendee that is associated with the user account and a second attendee that is associated with another user account of the distributed storage service.

17. The system of claim 15, wherein the pushing further comprises automatically sending the push notification to the other user account.

18. The system of claim 12, wherein the method, executed by the at least one processor, further comprises: receiving, from the client computing device, a selection, associated with the push notification, that indicates to share the cleaned-up whiteboard image with another attendee of the meeting attendees that is identified in the push notification, and sharing the cleaned-up whiteboard image with the other attendee.

19. The system of claim 12, wherein the retrieving of the image further comprises scanning image content associated with the client computing device and identifying the image from the scanned image content.

20. The system of claim 12, wherein the retrieving of the image further comprises receiving, from the client computing device, an upload of the image.

* * * * *